No. 745,468. PATENTED DEC. 1, 1903.
A. P. & C. H. WARNER.
MAGNETIC TACHOMETER.
APPLICATION FILED OCT. 1, 1902.
NO MODEL.
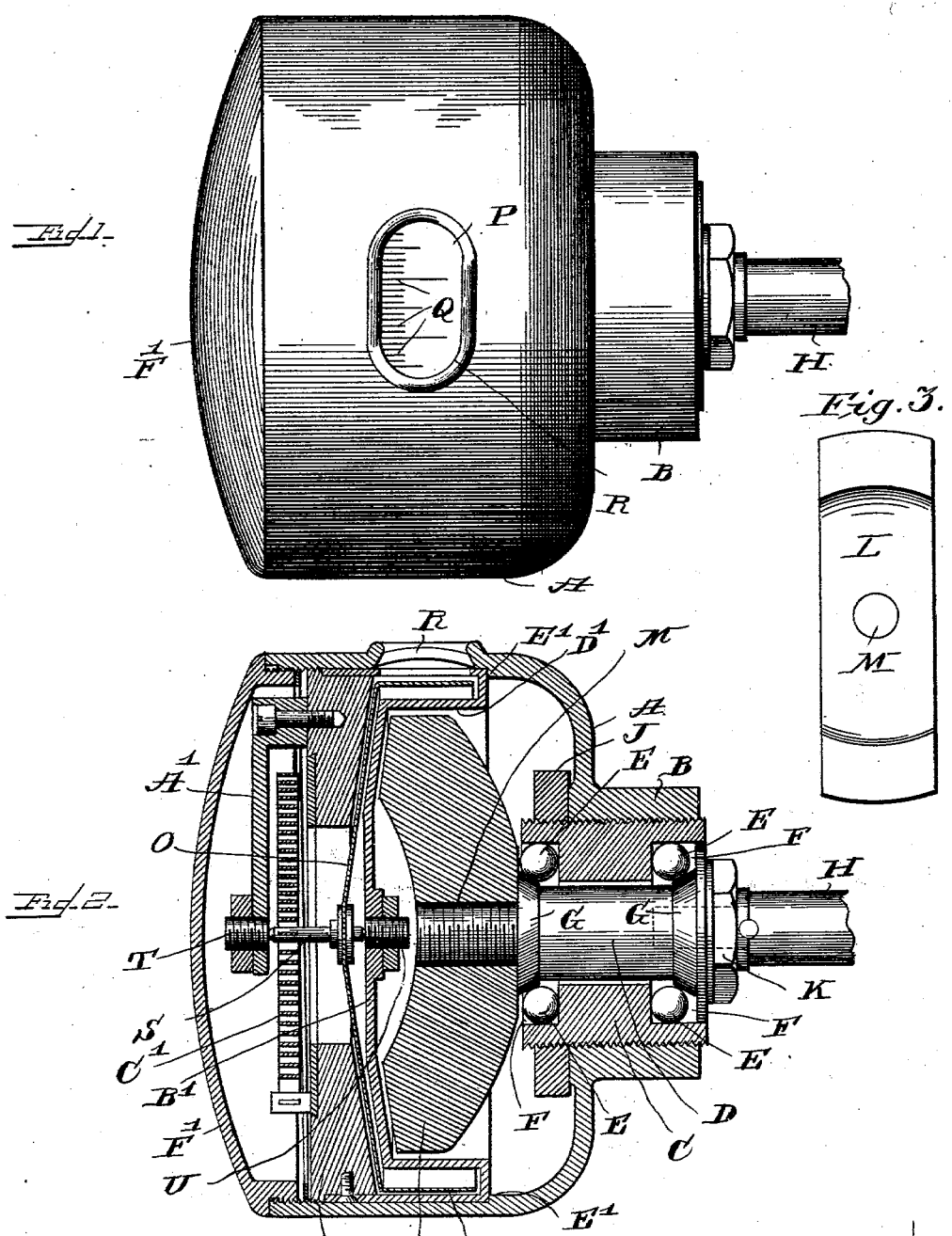

No. 745,468. Patented December 1, 1903.

UNITED STATES PATENT OFFICE.

ARTHUR P. WARNER, OF CHICAGO, ILLINOIS, AND CHARLES H. WARNER, OF BELOIT, WISCONSIN.

MAGNETIC TACHOMETER.

SPECIFICATION forming part of Letters Patent No. 745,468, dated December 1, 1903.

Application filed October 1, 1902. Serial No. 125,468. (No model.)

*To all whom it may concern:*

Be it known that we, ARTHUR P. WARNER, residing at Chicago, in the county of Cook and State of Illinois, and CHARLES H. WARNER, residing at Beloit, county of Rock, State of Wisconsin, citizens of the United States, have invented a new and useful Improvement in Magnetic Tachometers, of which the following is a specification.

This invention relates to magnetic tachometers.

The object of the invention is to provide a device which is simple and efficient for measuring the speed of rotation of shafts.

A further object of the invention is to provide a magnetic device of the class described which is capable of accurate calibration.

A further object of the invention is to provide a device of the character referred to which is simple and efficient and wherein the speed of rotation to be measured will be directly indicated.

Other objects of the invention will appear more fully hereinafter.

The invention consists substantially in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in side elevation of a device embodying the principles of my invention. Fig. 2 is a view in central longitudinal section of the same. Fig. 3 is a detail view in front elevation of the magnet shown in Fig. 2.

In the drawings reference-sign A designates a casing provided with a hub B, internally threaded and adapted to receive an exteriorly-threaded block C.

The shaft of the instrument is indicated by reference-sign D and is journaled within bearing-block C upon ball-bearings, the balls E being received in raceways F, formed in bearing-block C and retained therein by means of cone-collars G, mounted upon the instrument-shaft D.

H designates a shaft the rotations of which are to be measured, said shaft adapted to be coupled in any suitable or convenient manner to shaft D of the instrument. The position of the bearing-block C may be adjusted within hub B in any convenient manner—as, for instance, by means of set-nut J—and similarly the cone-bearings G of the ball-bearing may be adjusted by nut K. Mounted upon shaft D to rotate therewith is a permanent magnet L. A convenient arrangement is shown wherein shaft D is provided with a threaded extension M, adapted to be screwed into a central opening through permanent magnet L. Suitably fixed within casing A is a mass N of iron or other suitable magnetic material. In practice we prefer to employ this mass of iron in the form of a ring having a central opening therethrough. We also prefer to dish the mass of iron or magnetic material on the face thereof presented toward the poles of magnet L. This enables us to secure greater rigidity and strength and to obtain better results, and we suitably form the pole-faces of magnet L to lie in planes parallel with the adjacent surface of the magnetic mass. Suitably interposed between the opposed or juxtaposited faces of the mass N and magnet L is a rotary disk O, of suitable conducting material—such, for instance, as aluminium—said disk having a peripheral flange P, suitably graduated, as indicated at Q, Fig. 1. Through the casing A we arrange an opening R, so as to disclose therethrough the graduations Q upon the flange of disk O. The disk O may be mounted to rotate freely in any suitable or convenient manner. In the form shown, to which, however, our invention is not to be limited or restricted, the scale-disk O is mounted upon to rotate with a stud bearing pin S, the ends of which are pointed and journaled in seats formed in screw-plugs T and U. Screw-plug T is mounted in an arm A′, suitably secured to the fixed mass N or other stationary part. The screw-plug U is mounted centrally in a disk or shield plate B′, of non-magnetic material, which is interposed between scale-disk O and magnet L and is stationarily held within casing A. Rotative movement of disk O is yieldingly opposed in any suitable or convenient manner and in coöperative proportion to the rotative torque imparted to said disk. In the form shown we employ a hair-spring C', having one end fixed to the mass N and the other attached to the pin-shaft S.

In practice the casing A, shield disk or plate B', and arm A' we prefer to make of non-magnetic material—such, for instance, as brass—though we do not desire to be limited in this respect. The shield plate or disk B' is provided with a lateral flange D', which extends over and around the flange P of scale plate or disk O and rests against a shoulder (indicated at E') formed on the inner surface of casing A, said flange being backwardly turned from said shoulder and suitably secured to the mass N. The parts are inclosed within casing A and securely clamped and held in place therein in any suitable manner—as, for instance, by means of a screw cap or cover F', screwed into the threaded flange of casing A, as clearly indicated in the drawings.

By suitably adjusting the set-nut J the longitudinal displacement of bearing-block C, and consequently of shaft D, may be accurately adjusted to cause the pole-faces of magnet L to be adjusted nearer to or farther from the magnetic mass N. This is a valuable feature, inasmuch as it enables us to accurately calibrate the scale-disk O.

The operation of the device is as follows: When the instrument-shaft D is connected to a rotative shaft H and rotations are imparted thereto, such rotations are imparted to magnet L. By means of currents or magnetic effect created in the magnetic circuit, which includes the magnet L and the mass of magnetic material N, a rotative tendency is imparted to scale-disk O in the direction of rotation of magnet L and in direct proportion to the rotative speed of said magnet, such rotative tendency being opposed by spring C', and this opposition should be so relatively proportioned with respect to the magnetic effect created by the rotation of magnet L as to cause the scale-disk O to revolve to an extent in direct proportion to the speed of rotation of shaft L, and hence when said scaleplate is properly calibrated the exact speed of rotation of the shaft will be indicated in the graduations disclosed through the opening R in casing A, the latter being held stationary by hand or otherwise.

The shield-plate B' incloses the rotative scale-disk O so far as the rotating magnet is concerned and serves the important purpose of protecting said disk against danger of rotative displacement under the influence of air-currents created by the rotations of the magnet. In this manner the entire rotative tendency imparted to the scale-disk is due solely to the electromagnetic effect produced, and hence more accurate and perfect results are secured.

From the foregoing description it will be seen that we provide an exceedingly simple and efficient magnetic tachometer, the calibration of which can be adjustably regulated and wherein the construction is simple and the readings are direct.

Having now set forth the object and nature of our invention and a construction embodying the principles thereof, what we claim as new and useful and of our joint invention, and desire to secure by Letters Patent, is—

1. In a tachometer, a magnet and a magnetic mass, these parts mounted for relative rotation, said mass having the surface thereof presented toward the pole-faces of the magnet lying in a plane inclined relatively to the axis of such rotation, the pole-faces of said magnet being shaped to present a surface parallel to the inclined surface of said mass, and an independently-rotative scale-disk interposed between said mass and magnet, as and for the purpose set forth.

2. In a tachometer, a magnet, a magnetic mass, one of these parts mounted to rotate, a freely-rotative scale-disk interposed between said mass and magnet, and means for protecting said disk from the effects of air-currents created by said rotating part, as and for the purpose set forth.

3. The combination with a shaft, of a magnet connected thereto to rotate therewith, a magnetic mass in proximity to which said magnet rotates, and an independently-revoluble graduated disk interposed between said mass and magnet, and means for protecting said disk from air-currents created by the rotation of said magnet, as and for the purpose set forth.

4. In a tachometer, a magnet and a magnetic mass, one of these parts mounted to rotate with the shaft the speed of which is to be measured, means for adjusting the poles of said parts toward and from each other, and a scale-disk interposed between said parts and revolubly mounted, and means for opposing the rotary movement of said disk, as and for the purpose set forth.

5. In a tachometer, a magnet and a magnetic mass, one of these parts mounted to rotate with the shaft the speed of which is to be measured, a scale-disk interposed between said magnet and magnetic mass, said disk being mounted for independent rotative movement, means for yieldingly maintaining said disk in a normal or initial position, and means for adjusting the reluctance of the magnetic circuit of said magnet and mass, whereby said scale-disk may be calibrated, as and for the purpose set forth.

6. In a tachometer, a magnet and a magnetic mass, said parts mounted for relative rotation, in combination with a scale-disk associated with said parts and mounted for independent rotative movement, means normally operating to maintain said disk in initial or normal position, and means for adjusting the reluctance of the magnetic circuit of said magnet and mass, whereby said scaledisk may be accurately calibrated, as and for the purpose set forth.

7. In a tachometer, a magnet and a magnetic mass arranged for relative rotation, in combination with an independently-rotative scale-disk arranged to be influenced by the magnetic circuit of said mass and magnet, means for yieldingly opposing such influence, and means for protecting said disk from air-currents generated by the rotating part, as and for the purpose set forth.

8. A tachometer, comprising a magnet and a magnetic mass, one of these parts being stationarily held and the other mounted for rotation, a graduated disk interposed between said magnet and mass, a fixed plate interposed between said disk and said rotating part, and means for yieldingly opposing the rotary movement of said disk, as and for the purpose set forth.

9. In a tachometer, a casing having a hub, a bearing-block adjustably mounted in said hub, a shaft journaled upon ball-bearings in said bearing-block, and carrying a magnet, said shaft connected to rotate with the rotating part the speed of which is to be measured, a magnetic mass arranged within said casing and provided with an arm, a plate arranged within said casing and interposed between said mass and magnet, bearings carried by said arm and plate, a disk interposed between said plate and mass, a supporting-pin therefor, said pin journaled in the bearings in said arm and plate whereby said disk is permitted independent rotation, a spring connected at one end to said mass and at the other end to said pin, said disk carrying graduations; all combined and arranged as and for the purpose set forth.

In witness whereof ARTHUR P. WARNER has hereunto set his hand this 23d day of September, 1902, in the presence of the subscribing witnesses, and the said CHARLES H. WARNER has set his hand this 25th day of September, 1902, in the presence of the subscribing witnesses.

ARTHUR P. WARNER.
CHARLES H. WARNER.

Witnesses for Arthur P. Warner:
 CHAS. H. SEEM,
 EDWIN C. SEMPLE.
Witnesses for Charles H. Warner:
 B. L. LAWSON,
 E. BRITTAN.